(12) United States Patent
Bellman et al.

(10) Patent No.: US 6,633,700 B2
(45) Date of Patent: Oct. 14, 2003

(54) DOUBLE LENS ARRAY FOR OPTICAL CROSS-CONNECTS

(75) Inventors: Robert A. Bellman, Painted Post, NY (US); Ronald L. Burt, Painted Post, NY (US); Donald M. Trotter, Newfield, NY (US); Ljerka Ukrainczyk, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/919,141

(22) Filed: Jul. 31, 2001

(65) Prior Publication Data

US 2003/0031409 A1 Feb. 13, 2003

(51) Int. Cl.[7] .............................. G02B 6/32; G02B 6/06
(52) U.S. Cl. ........................ 385/33; 385/52; 385/119
(58) Field of Search ........................... 385/33–35, 38, 385/39, 52, 119

(56) References Cited

U.S. PATENT DOCUMENTS

| | | | |
|---|---|---|---|
| 4,186,999 A | | 2/1980 | Harwood et al. ............. 385/66 |
| 4,475,788 A | * | 10/1984 | Tomassini et al. ............ 385/33 |
| 4,998,795 A | | 3/1991 | Bowen et al. ................ 385/78 |
| 5,140,660 A | | 8/1992 | Takahashi ..................... 385/79 |
| 5,263,103 A | | 11/1993 | Kosinski ....................... 385/31 |
| 5,293,438 A | | 3/1994 | Konno et al. ................. 385/35 |
| 5,346,583 A | | 9/1994 | Basavanhally .............. 156/629 |
| 5,555,333 A | * | 9/1996 | Kato ............................ 385/89 |
| 5,621,831 A | * | 4/1997 | Staver et al. ................. 385/33 |
| 6,374,012 B1 | * | 4/2002 | Bergmann et al. ............ 385/33 |
| 2002/0031301 A1 | * | 3/2002 | Sasaki et al. ................. 385/34 |
| 2002/0034363 A1 | * | 3/2002 | Wickman et al. ............. 385/88 |

FOREIGN PATENT DOCUMENTS

WO   WO 04/71403   9/2001   ............ G02B/6/32

* cited by examiner

*Primary Examiner*—Georgia Epps
*Assistant Examiner*—M. Hasan
(74) *Attorney, Agent, or Firm*—Adenike A. Adewuya; Timothy M. Schaeberle

(57) ABSTRACT

A method for aligning optical fibers with an optical component includes making a lens on an end of each optical fiber to form a microlensed fiber and arranging the microlensed fibers such that an optical axis of each of the optical fibers is oriented along a common direction. The method further includes positioning each lens a selected distance from the optical component so as to couple light into and out of the optical component.

18 Claims, 6 Drawing Sheets

DOUBLE LENS ARRAY FOR OPTICAL CROSS-CONNECTS

BACKGROUND OF INVENTION

1. Field of the Invention

The invention relates generally to fiber-optic systems. More specifically, the invention relates to a method for aligning optical fibers to a lens array.

2. Background Art

Fiber-optic lightwave technology has found enormous application in long-distance communication. Copper wires and coaxial cables, and even microwave relays and satellites in some cases, are being replaced by fiber-optic systems. Fiber-optic links have several advantages over their metallic-based counterparts. These advantages include lower loss, higher information-carrying capacity, lower cost per channel, and a smaller physical mass. Currently, fiber-optic links carry hundreds of terabits per second over distances greater than 1,000 km. Even though this is orders of magnitude beyond the capacity of metallic links, the demands of global communication are driving the system capacity to double every year. To meet these demands, techniques such as wavelength division multiplexing (WDM) are being used to increase the transmission capacity of the fiber-optic link.

In WDM systems, many optical signals at different wavelengths are combined into a single beam for transmission in a single optical fiber. At the exit of the fiber, a demultiplexer is used to separate the beam by wavelength into independent signals. In communication networks employing transmission formats such as WDM, a cross-connect is needed to selectively route individual optical signals to different destinations. An N×N cross-connect is a switch fabric that can switch a signal from any of N transmission lines to another of the N transmission lines. In optical networks, the majority of the signal routing is still performed electronically. This requires frequent optical-to-electrical and electrical-to-optical signal conversion, which slows down the network. To take full advantage of speed and bandwidth of optical signal transmission, an all optical network is required.

One approach to large-scale optical cross-connect, e.g., 1024×1024 cross-connect, is based on free-space (three-dimensional) micro-optic switching. In micro-optic switching, the optical signal from a channel is re-routed by an array of micro-electronic (MEMS) actuated mirrors or prisms to any of the other output channels and then focused back into the output fiber by an array of collimating lenses. For free-space micro-optic switching, the optical fibers need to be arrayed and aligned with the array of collimating lenses. The challenge in making this type of cross-connect is aligning a large number of optical fibers to a large lens array and preserving that alignment. Prior art methods for aligning fibers to a lens array involve gluing or splicing an optical fiber to a substrate with an array of collimating lenses. FIG. 1 shows a prior art example wherein a fiber 2 is bonded to a substrate 4 by epoxy 6. The substrate 4 carries a collimating lens 8. For an N×N cross-connect, N×N such fiber-substrate connections would have to be made.

Connecting the fiber to the substrate by gluing or splicing requires serial alignment of each fiber in the array, which is a very time consuming process for a large-scale optical cross-connect. This has often hindered the development of large-scale optical cross-connects. Therefore, a more efficient method for aligning a large number of fibers to a large lens array is desired.

SUMMARY OF INVENTION

In one aspect, the invention relates to a method for aligning optical fibers with an optical component which comprises making a lens on an end of each optical fiber to form a microlensed fiber and arranging the microlensed fibers such that an optical axis of each of the optical fibers is oriented along a common direction. The method further includes positioning each lens a selected distance from the optical component so as to couple light into and out of the optical component.

In another aspect, the invention relates to an optical component which comprises a plurality of optical fibers arranged in an array and aligned along a common direction. Each of the optical fibers has a lens attached to an end thereof. The optical component further includes a body having an array of holes for receiving the array of optical fibers.

In another aspect, the invention relates to a multichannel component which comprises an optical component and a plurality of optical fibers arranged in an array and aligned along a common direction. Each optical fiber has a lens attached to an end thereof. The lens is positioned a selected distance from the optical component so as to couple light into and out of the optical component.

In another aspect, the invention relates to a device for an optical cross-connect which comprises a microlens array and an array of microlensed fibers positioned a selected distance from the microlens array to couple light into and out of the microlens array.

Other aspects and advantages of the invention will be apparent from the following description and the appended claims.

DETAILED DESCRIPTION

Embodiments of the invention provide a method for aligning optical fibers to a large lens array such as ones used for three-dimensional, optical cross-connects. The method comprises pre-assembling microlensed fibers and positioning the microlensed fibers to couple light into the lens array. A microlensed fiber is a fiber having a lens attached to one of its ends. The method of the invention eliminates the need to serially align each fiber with the lens array, provides greater tolerances toward misalignment while still achieving acceptable optical losses, and facilitates coupling of the fibers with the lens array. This could enable relaxation of manufacturing tolerances, assembly simplification, and manufacturing cost reduction. Further, the method of the invention provides a desirable flexibility in optical design because the two lenses, i.e., the lens on the microlensed fiber and a lens on the lens array, can operate as a "telescope" to provide a more highly collimated beam than a single lens. The multiple lens approach can also be extended to other applications where light needs to be coupled in and out of the optical fiber and into either a single collimator or arrayed lenses.

Figure 2:
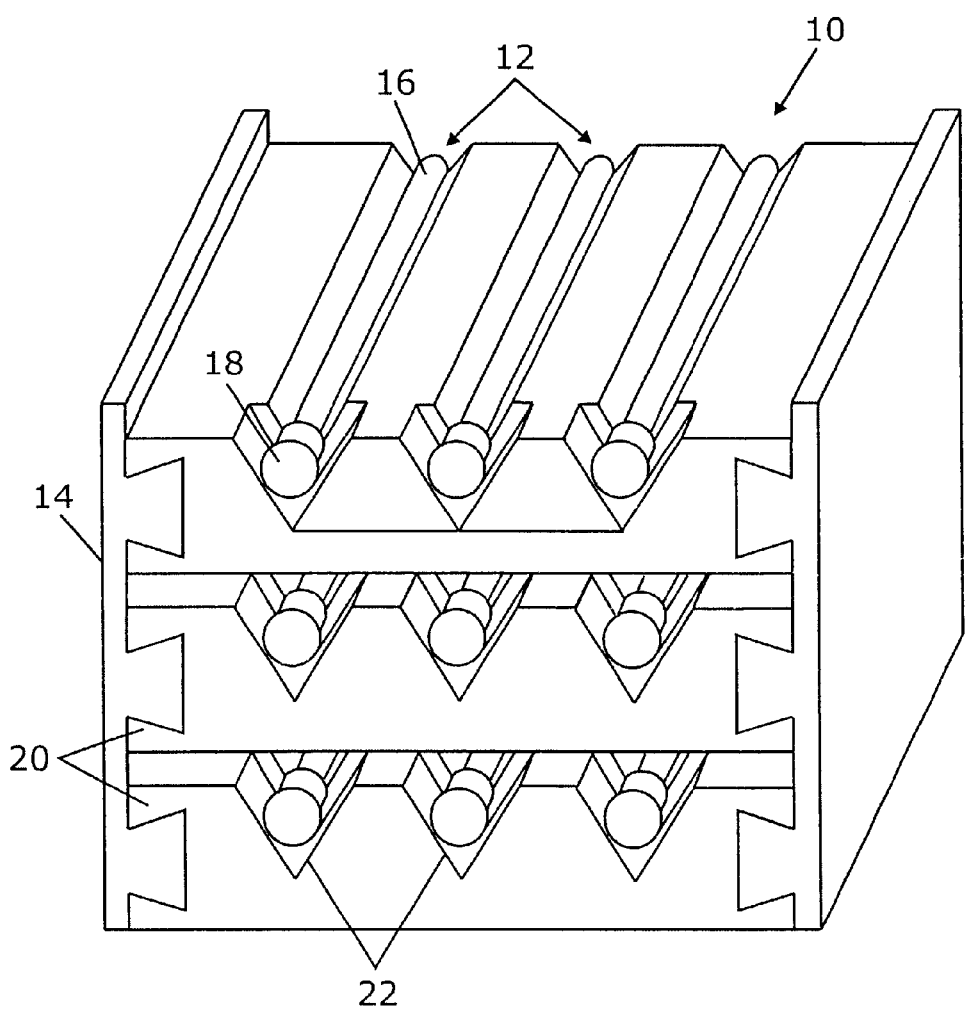
FIG. 2 is a three-dimensional view of a microlensed fiber array according to one embodiment of the invention.

Specific embodiments of the invention will now be described with reference to the accompanying drawings. FIG. 2 shows a pre-assembled microlensed fiber array 10 according to one embodiment of the invention. The microlensed fiber array 10 includes microlensed fibers 12, each of which has an optical axis (23 in FIG. 3A) aligned along a common direction. Each microlensed fiber 12 includes an optical fiber 16 and a lens 18 formed at an end of the optical fiber 16. One suitable method for forming the microlensed fiber 12 is based on fusion processes. This method generally involves aligning a rod made of lens material, such as $SiO_2$, $B_2O_3$—$SiO_2$, and $GeO_2$—$SiO_2$, with an optical fiber. The opposing ends of the rod and optical fiber are then fusion-spliced together, i. e., by forcing them together while melting. Typically, a tungsten filament loop, such as included in a fusion splicer sold under the trade name FFS-2000 by Vytran Corporation, provides the heat to fuse the rod to the optical fiber. After fusing the rod to the optical fiber, the rod is taper-cut and melted back to provide the desired lens shape and radius of curvature.

The microlensed fibers 12 are arranged in a body 14. In the illustrated embodiment, the body 14 is made of an interlocking stack of V-grooved plates 20. However, as will be further illustrated below, the invention is not limited to an interlocking stack of V-grooved plates. The microlensed fibers 12 are arranged in the V-grooves 22 cut in the plates 20. As illustrated, the ends of the V-grooves 22 are broader and deeper to provide relief for the lenses 18 formed at the ends of the fibers 16. Alternatively, the lenses could project beyond the edge of an array of uniform V-grooves.

Figure 3A:
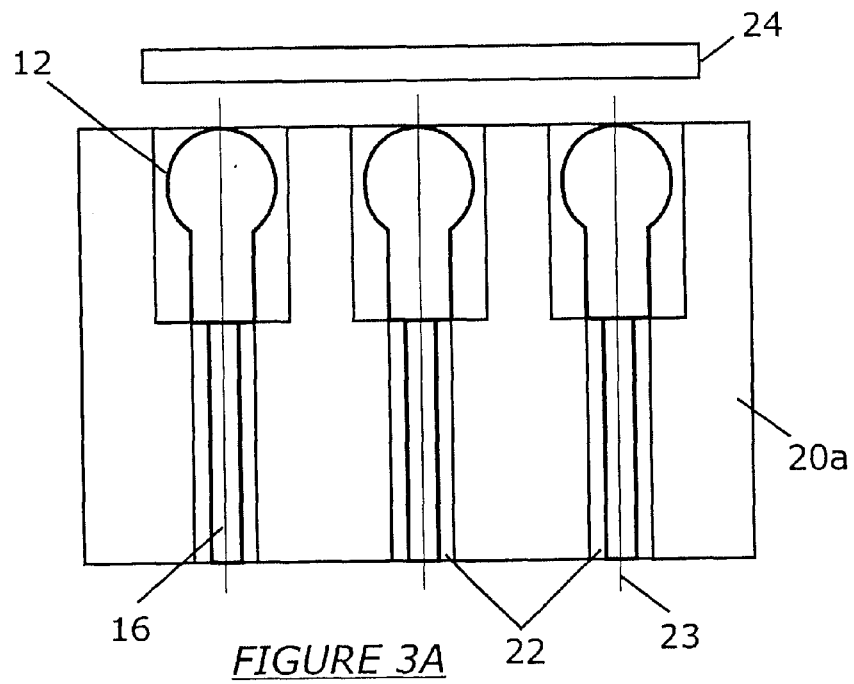
FIGS. 3A and 3B illustrate a process for assembling the microlensed fiber array shown in FIG. 2.

To assemble the microlensed fiber array 10, an optical alignment device such as a CCD ("charge coupled device") array or a mirror with power peaking of reflected light is needed to align the optical axes of the microlensed fibers 12 along a common direction. As shown in FIG. 3A, the process for assembling the microlensed fiber array (10 in FIG. 2) involves placing an optical alignment device 24, such as a CCD array, in front of a first V-grooved plate 20a. Microlensed fibers 12 are then placed in the V-grooves 22 and aligned with the aid of the optical alignment device 24. After the alignment step, the microlensed fibers 12 are secured to the V-grooved plate 20a. As an example, the microlensed fibers 12 may be secured to the V-grooved plate 20a by applying a bonding material, such as epoxy, between the fiber portions 16 of the microlensed fibers 12 and the V-grooves 22. Alternatively, the V-groove plate 20a could be made from a material like silica having a coefficient of expansion matching the microlensed fibers 12. In this case, laser welding or a glass frit can be used to affix the fiber portions 16 to the V-grooved plate 22.

Figure 3B:
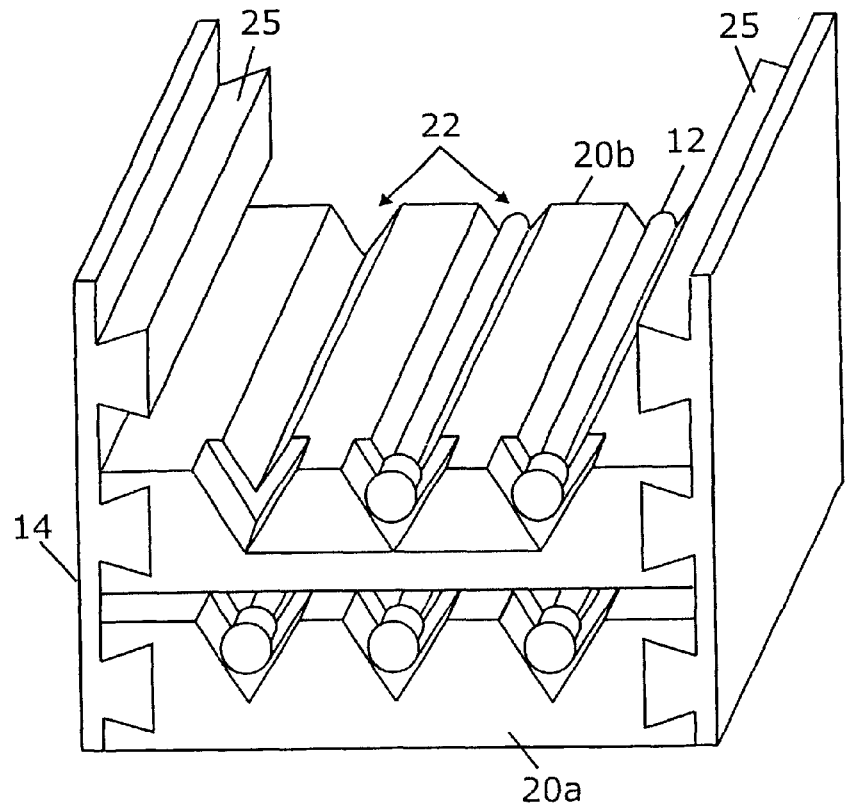
Figure 4A:
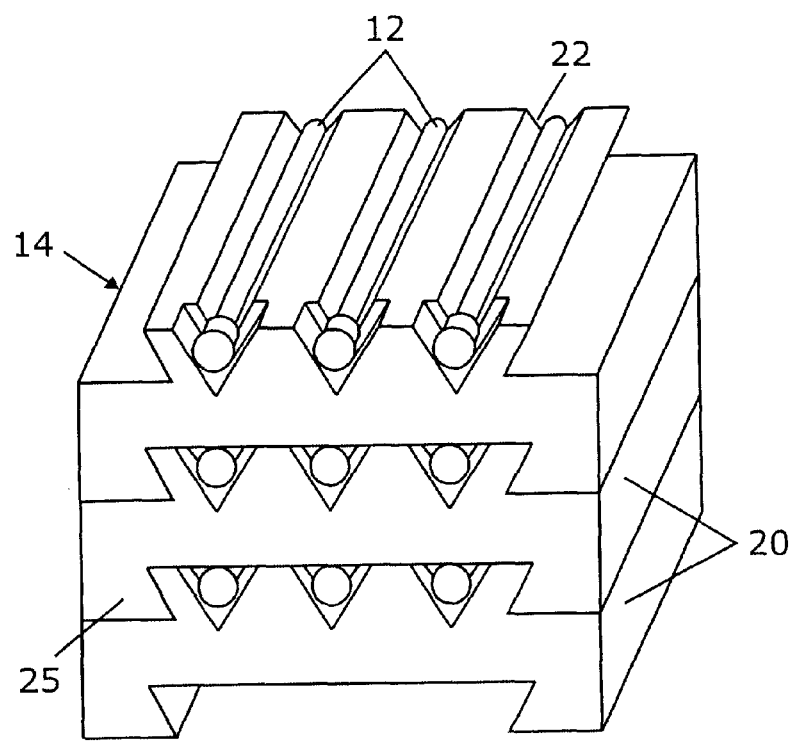
FIG. 4A is a front view of a microlensed fiber array having microlensed fibers arranged in interlocking plates according to another embodiment of the invention.

After aligning and securing the microlensed fibers 12 to the V-grooved plate 20a, another V-grooved plate 20b is stacked on top of the V-grooved plate 20a, as shown in FIG. 3B. Then microlensed fibers 12 are placed in the V-grooves 22 in the V-grooved plate 20b and aligned and secured in place as previously described for the V-grooved plate 20a. The process of stacking V-grooved plates and arranging and securing microlensed fibers in V-grooves is repeated until the desired size of microlensed fiber array is formed. In the figure, dovetails 25, or other alignment fixtures, are used to align and interlock the V-grooved plates 20a, 20b. It should be noted that there are many types of dovetails. FIG. 4A shows another type of dovetail 25 for interlocking and aligning the V-grooved plates 20.

Figure 4B:
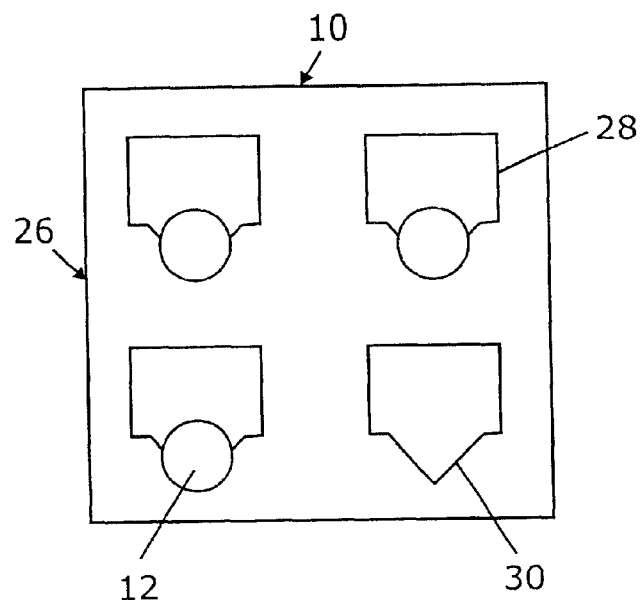
FIG. 4B is a front view of microlensed fiber array having microlensed fibers arranged in keyholes in a body according to another embodiment of the invention.

In an alternate embodiment, such as shown in FIG. 4B, the microlensed fiber array 10 may be fabricated from a single body 26 with keyholes 28 for inserting the microlensed fibers 12. This eliminates the need for alignment fixtures such as dovetails. In one embodiment, the keyholes 28 include V-grooves 30 for aligning the microlensed fiber 12. The microlensed fibers 12 are first inserted in the keyholes 28 and then dropped into the V-grooves 30, where they are aligned and secured in place.

Figure 5:
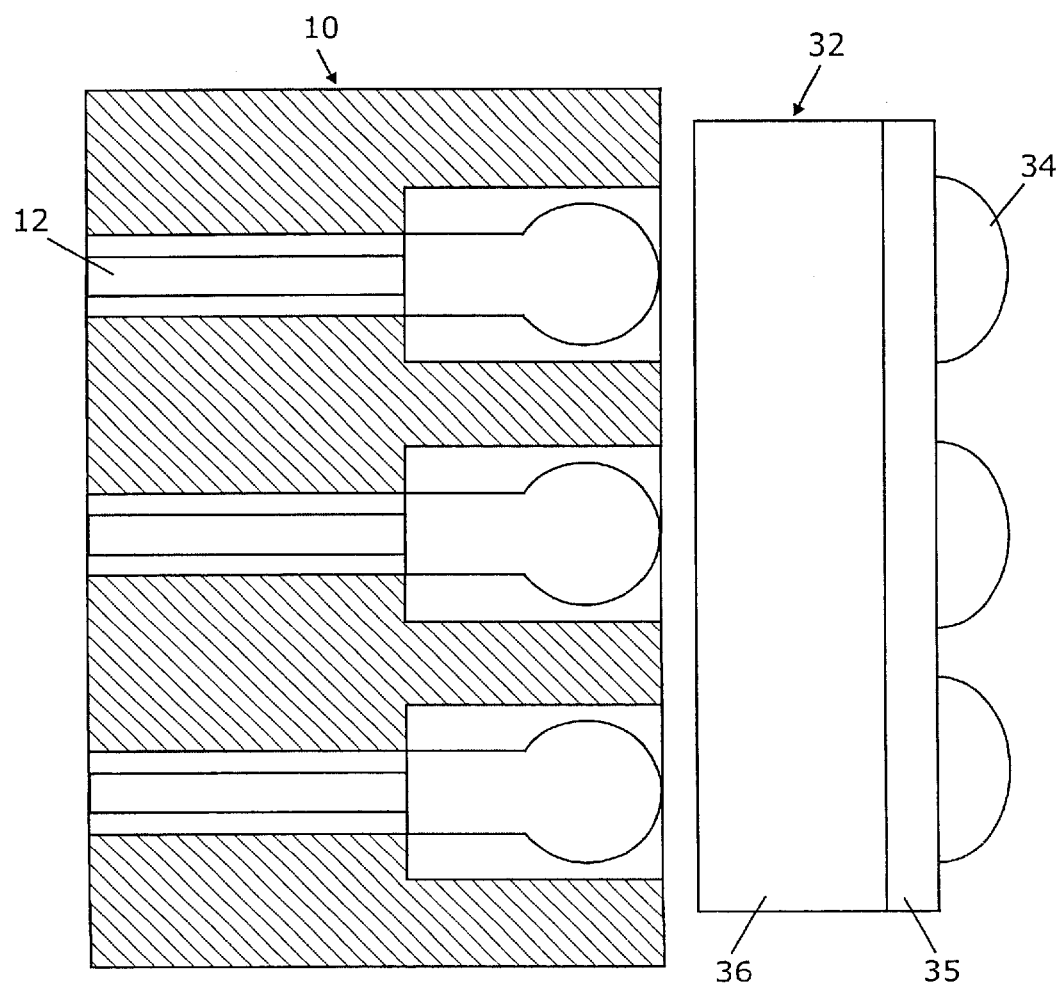
FIG. 5 shows a microlensed fiber array positioned to couple light into a lens array.

FIG. 5 shows the microlensed fiber array 10 positioned to couple light into a collimating microlens array 32. In the illustrated embodiment, the microlens array 32 includes an array of collimating lenses 34 formed on a polymer base layer 35 on a substrate 36. The substrate 36 is made of a glass material such as fused silica. The present invention is also operative with collimating microlens array fabricated by, for example, reactive ion etching to transfer a molded polymer lens into a glass such as silica, or diffractive lens arrays.

Figure 1:
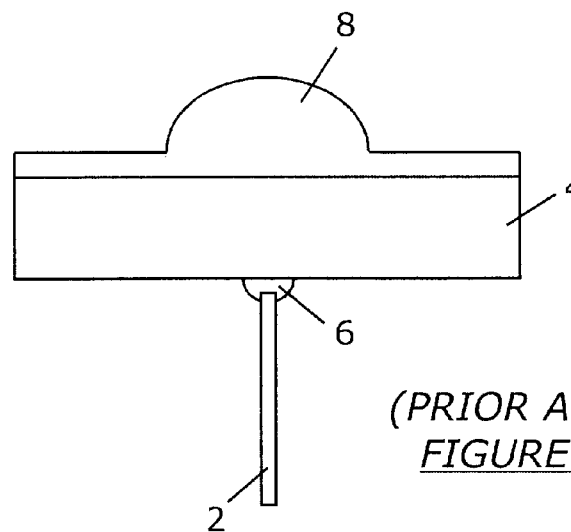
FIG. 1 shows an optical fiber glued to a substrate carrying a collimating lens.
Figure 6:
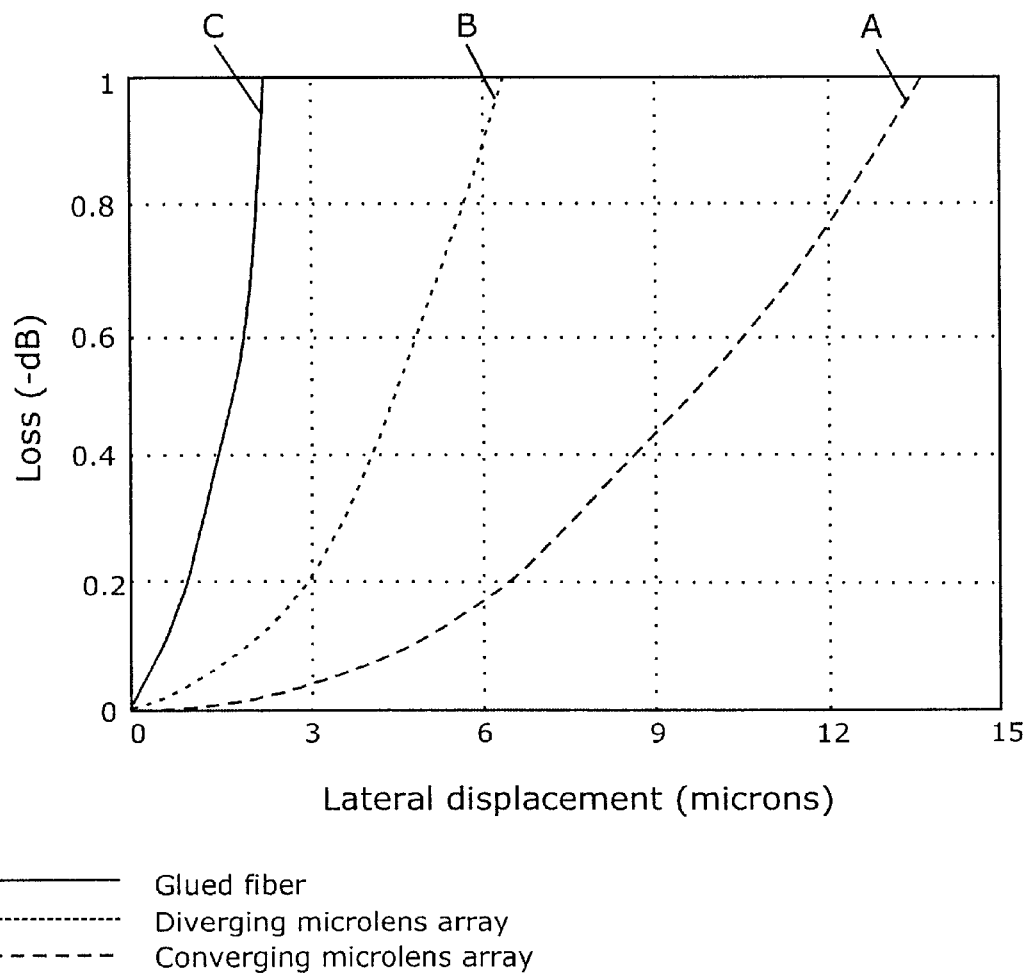
FIG. 6 is a comparison of optical loss versus lateral displacement tolerances for the fiber-lens alignment method of the present invention and the prior art alignment method illustrated in FIG. 1.

FIG. 6 is a chart showing how much lateral displacement tolerances would improve using the fiber-lens alignment method of the invention, such as illustrated in FIG. 5. In particular, FIG. 6 shows loss versus lateral displacement curves for three fiber-lens alignment configurations A, B, and C. Configurations A and B use the fiber-lens alignment method of the present invention (see FIG. 5), while configuration C uses the prior-art fiber-lens alignment method of gluing (see FIG. 1).

Figure 7:
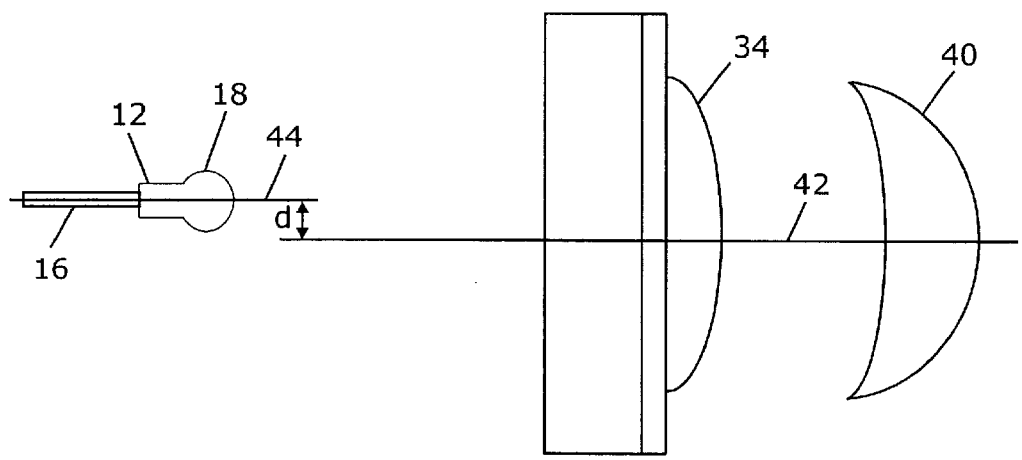
FIG. 7 shows the optical axis of a microlensed fiber laterally displaced from the optical axis of a collimating lens.

FIG. 7 shows the model for configurations A and B. For configurations A and B, the beam coming from MEMS mirror 40 is assumed to be on the optical axis 42 of the collimating lens 34, and the optical axis 44 of the microlensed fiber 12 is offset a distance d from the optical axis 42 of the collimating lens 34. For configuration A, the lens 18 of the microlensed fiber 12 is a planoconvex converging lens. For configuration B, the lens 18 of the microlensed fiber 12 is a planoconvex diverging lens.

Figure 8:
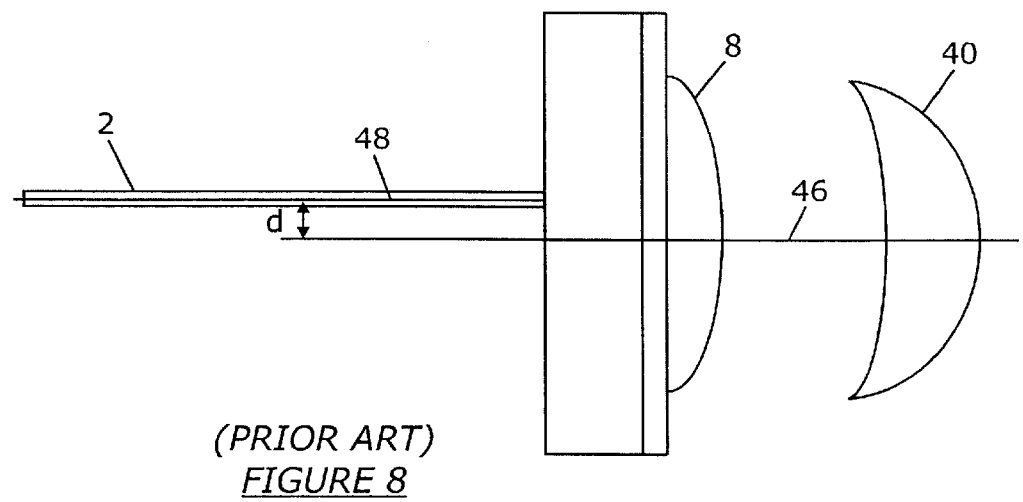
FIG. 8 shows the optical axis of an output fiber laterally displaced from the optical axis of a collimating lens.

FIG. 8 shows the model for configuration C. For configuration C, the beam coming from MEMS mirror 40 is assumed to be on the optical axis 46 of the collimating lens 8, and the optical axis 48 of the fiber 2 (glued to the collimating lens substrate) is offset a distance d from the optical axis 46 of the collimating lens 34.

From the calculated graphs shown in FIG. 6, it is apparent that the fiber-lens alignment method of the present invention, i.e., configurations A and B, has better lateral displacement tolerance than the prior art alignment method of gluing, i.e., configuration C. Table 1 shows additional calculation for configurations A, B, and C. As shown in Table 1, lateral displacement resulting in a 0.2 dB excess loss for configuration C (glued fiber) is ±1 micron, for configuration B (diverging microlensed fiber array) is ±3 microns, and for configuration A (converging microlensed fiber array) is ±7 microns.

TABLE 1

Comparison of lateral displacement tolerance for 0.2 db loss

| | Distance to lens substrate | Thickness of lens substrate | Distance to beam waist (cm) | Rc (μm) | Beam radius at lens exit | Beam radius at beam waist (μm) | Lateral tolerance (μm) |
|---|---|---|---|---|---|---|---|
| A | 3 cm (air) | 7.5 mm | 19 | 15948 | 546 | 184 | ±7 |
| B | 1 cm (air) | 7.5 mm | 19 | 8358 | 437 | 282 | ±3 |
| C | 40 (μm) (epoxy) | 7.5 mm | 19 | 2859 | 435 | 300 | ±1 |

The invention provides several advantages. By pre-assembling an array of aligned fibers, the need to serially align each fiber with a lens array is eliminated. Further, the invention provides greater tolerances toward misalignment while still achieving acceptable optical losses. Further, there is no bonding material in the optical path, as in the case of the prior art alignment method of FIG. 1 wherein a bonding material is applied between the fiber and collimating lens. Lower back reflection compared with prior art methods such as FIG. 1 also results. The combined "telescope" effect of the microlensed fiber array and lens array also provides a more highly collimated beam.

As previously mentioned, the invention is not limited to alignment of fibers with microlens arrays. The invention is applicable in general to alignment of fibers with any type of lens array. The invention is also applicable when it is desired to couple light into and out of a single fiber using a single collimator lens.

The invention also provides more flexibility in designing beam size at the lens exit and at the mirror. For example, configuration A and B (see FIG. 7) give smaller beam waist at MEMS mirror (40 in FIG. 7) than configuration C (see FIG. 8), thus smaller mirror can be used without clipping the beam. Additionally, the radius of curvature of the lens (18 in FIG. 7) made at the end of the optical fiber (16 in FIG. 7) is large in configurations A and B, which makes it easier and faster to make large lens by etching silica plate.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of making an array of collimated beams from an array of optical fibers, comprising:

arranging a plurality of lensed fibers such that their optical axes are oriented along a common direction, each lensed fiber having a planoconvex lens disposed at an end of an optical fiber, the planoconvex lens expanding a beam emerging from the optical fiber to reduce back-reflection; and positioning a lens component a selected distance from the planoconvex lenses so as to produce an array of collimated beams from the expanded beams, the expanded beams enabling improved tolerance alignment between the optical fibers and the lens component.

2. The method of claim 1, wherein the lens component comprises a lens array.

3. The method of claim 1, wherein the lens component comprises an array of collimating lenses.

4. The method of claim 1, wherein the lens component comprises an array of diffractive lenses.

5. The method of claim 1, wherein arranging the lensed fibers comprises disposing the lensed fibers in a plurality of holes in a body.

6. The method of claim 5, wherein disposing the lensed fibers in the plurality of holes in a body comprises bonding the optical fibers to the body.

7. The method of claim 1, further comprising coupling light from the array of optical fibers to a second array of optical fibers over a long distance by passing the array of collimated beams through a second lens component and then through a second set of planoconvex lenses disposed at the ends of the second array of optical fibers into the second array of optical fibers.

8. A method of making a collimated beam from an optical fiber, comprising:

aligning a lensed fiber to a lens component, the lensed fiber having a planoconvex lens disposed at an end of an optical fiber, the planoconvex lens expanding a beam emerging from the optical fiber to reduce back-reflection; and positioning a lens component a selected distance from the planoconvex lens so as to produce a collimated beam from the expanded beam, the expanded beam enabling improved tolerance alignment between the optical fiber and the lens component.

9. The method of claim 8, wherein the lens component comprises a collimator.

10. A multichannel component, comprising:

a lens component; and a plurality of lensed fibers arranged in an array and aligned along a common direction, each lensed fiber having a planoconvex lens disposed at an end of an optical fiber, the planoconvex lenses positioned a selected distance from the lens component, wherein the planoconvex lenses expand beams emerging from the optical fibers to reduce back-reflection, the lens component produces an array of collimated beams from the expanded beams, and the expanded beams enable improved tolerance alignment between the optical fibers and the lens component.

11. The multichannel component of claim 10, wherein the lens component comprises a lens array.

12. The multichannel component of claim 10, further comprising a body having an array of grooves for receiving the array of lensed fibers.

13. The multichannel component of claim 12, wherein the optical fibers are fixed to the body.

14. The multichannel component of claim 12, wherein the grooves are V-grooves.

15. The multichannel component of claim 10, wherein the body comprises a stack of plates having grooves for receiving the array of lensed fibers.

16. A device for an optical cross-connect, comprising:

a lens array; and an array of lensed fibers positioned a selected distance from the lens array, each lensed fiber having a planoconvex lens disposed at an end of an optical fiber, wherein the planoconvex lenses expand beams emerging from the optical fibers to produce expanded beams having reduced back-reflection, the lens array produces an array of collimated beams from the expanded beams, and the expanded beams enable improved tolerance alignment between the optical fibers and the lens array.

17. The device of claim 16, further comprising means of re-directing an optical beam.

18. The device of claim 17, wherein the means of re-directing an optical beam comprises a mirror.

* * * * *